A. LARSEN.
AUTOMATIC WEIGHING MACHINE.
APPLICATION FILED DEC. 10, 1914.
1,278,481.
Patented Sept. 10, 1918.
6 SHEETS—SHEET 1.
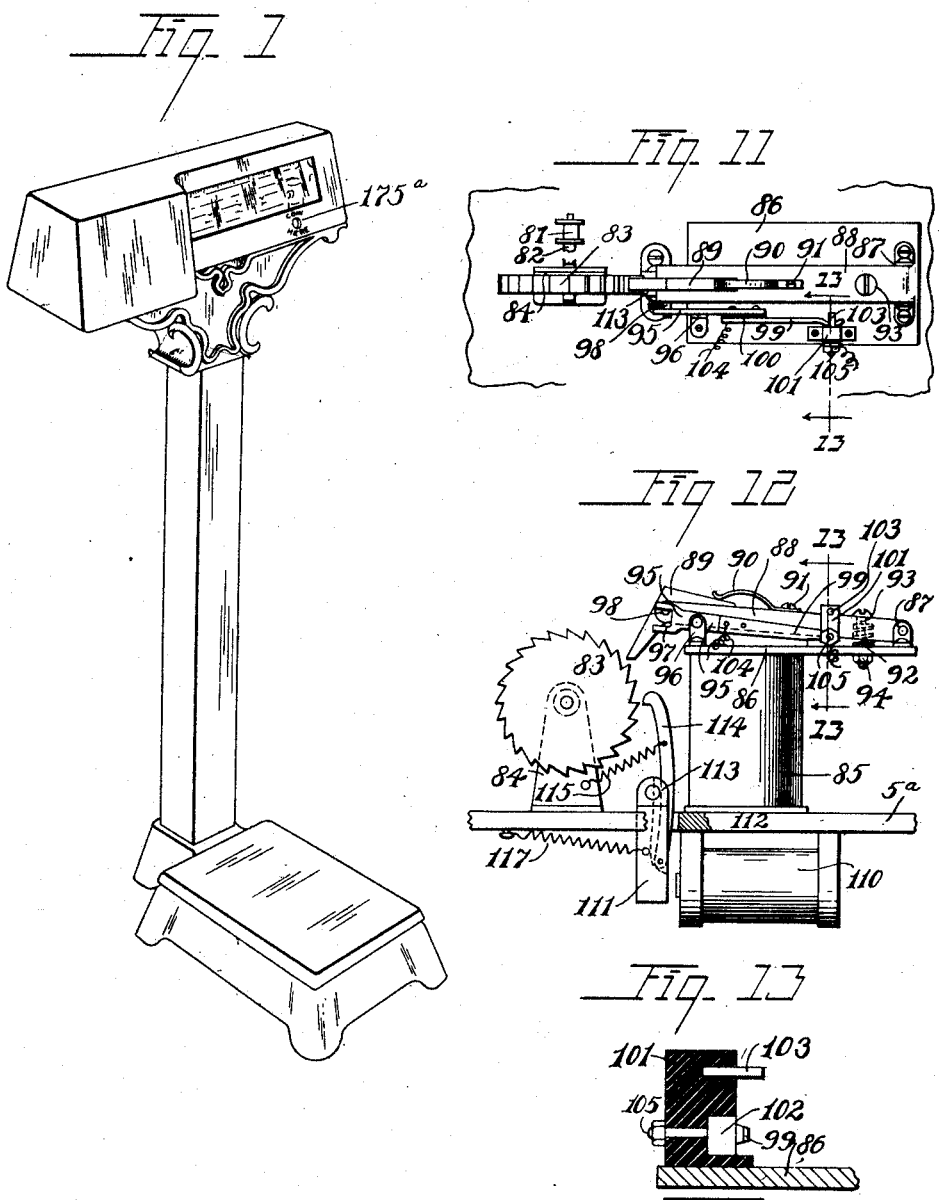

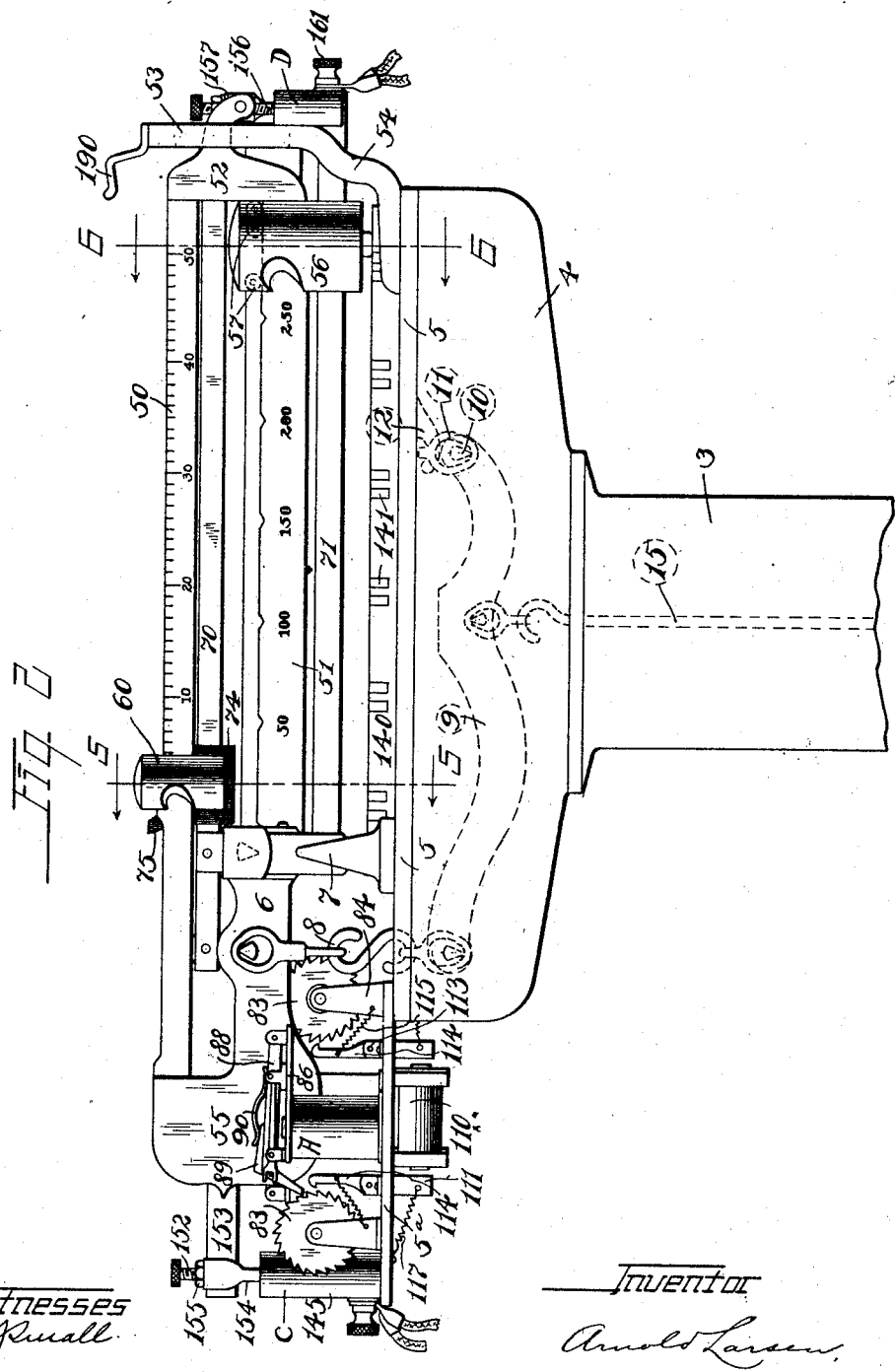

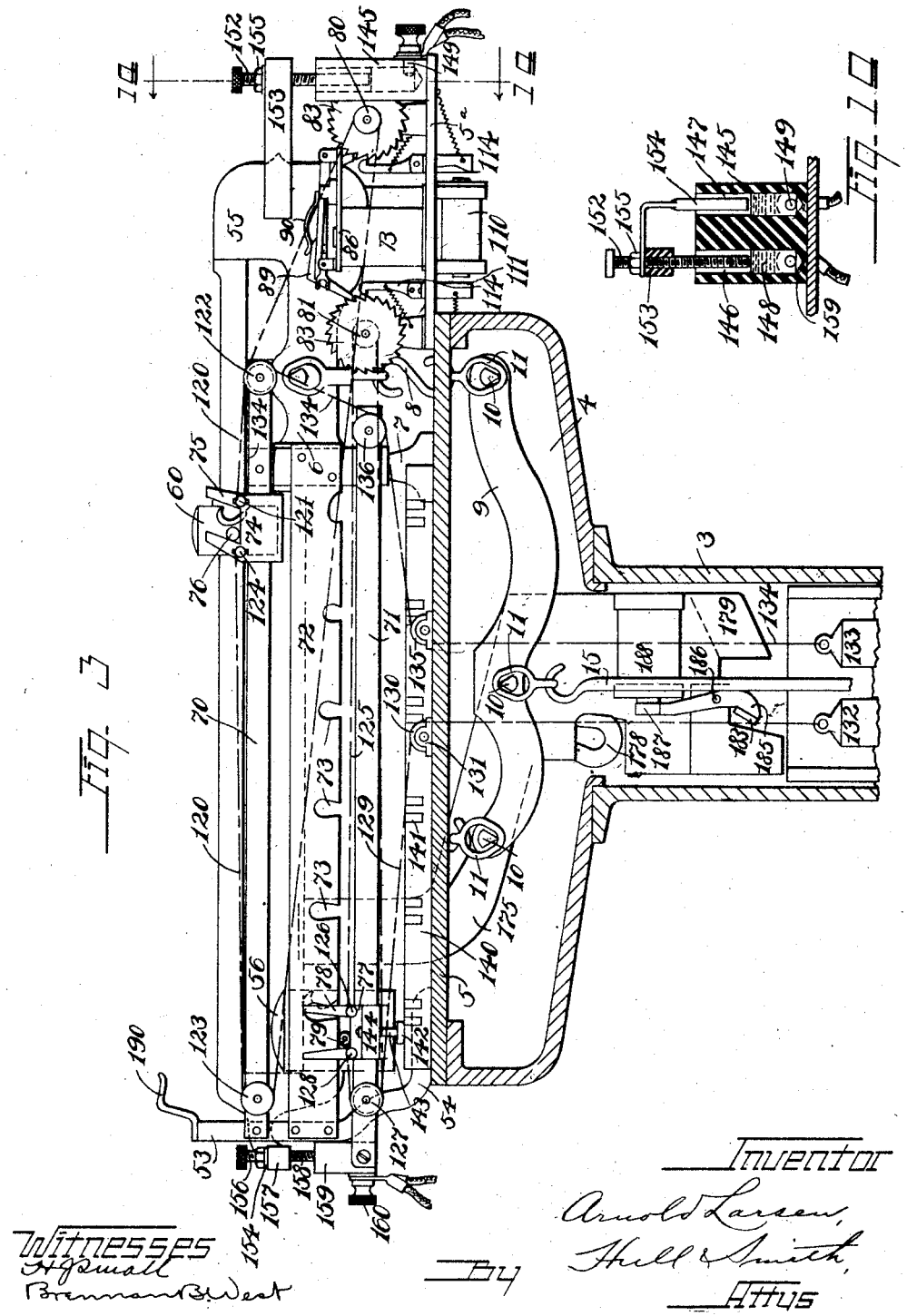

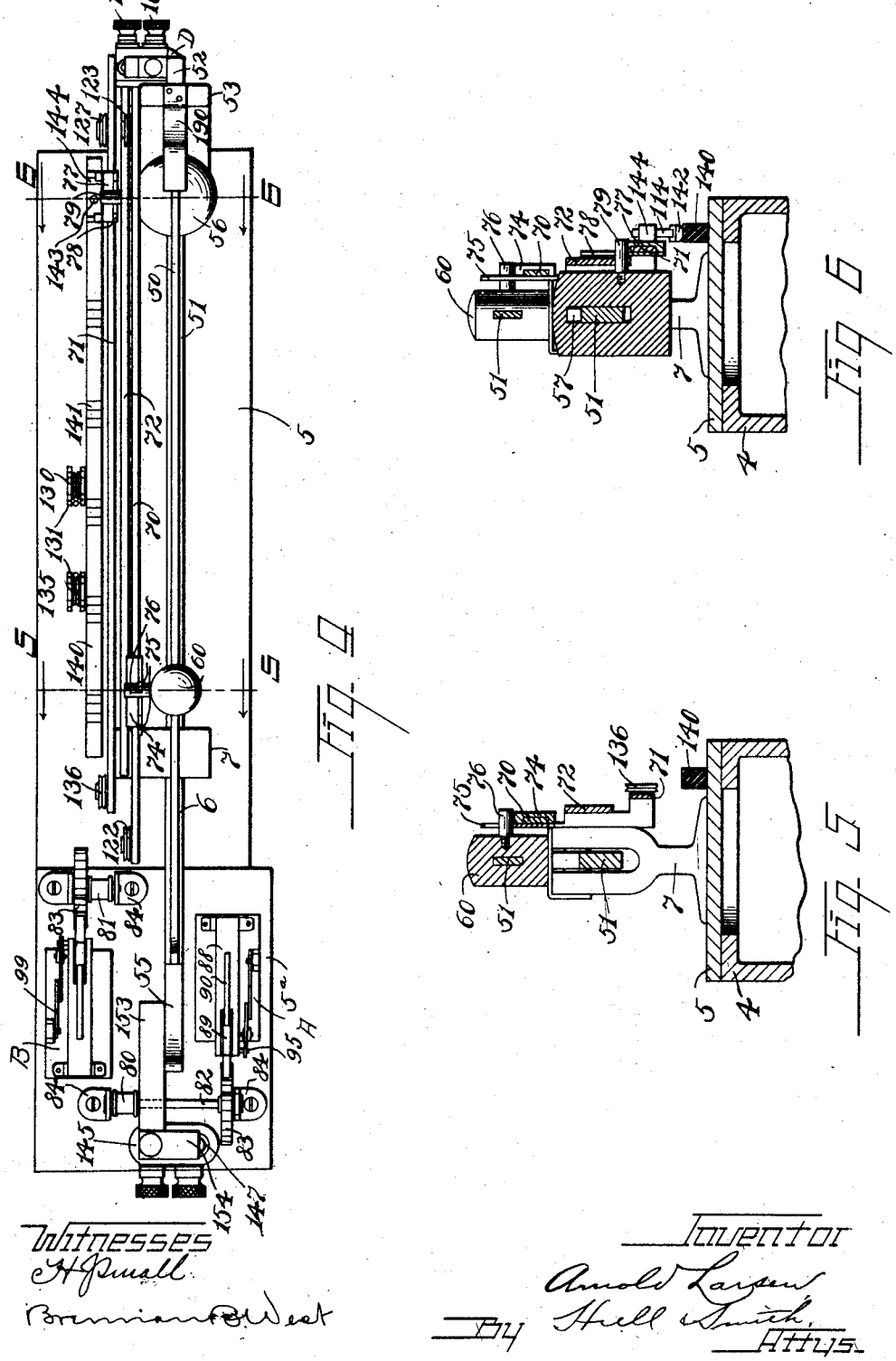

A. LARSEN.
AUTOMATIC WEIGHING MACHINE.
APPLICATION FILED DEC. 10, 1914.

1,278,481.

Patented Sept. 10, 1918.
6 SHEETS—SHEET 5.

Witnesses
H. Small
Brennan B. West

Inventor
Arnold Larsen,
By Hull & Smith,
Attys.

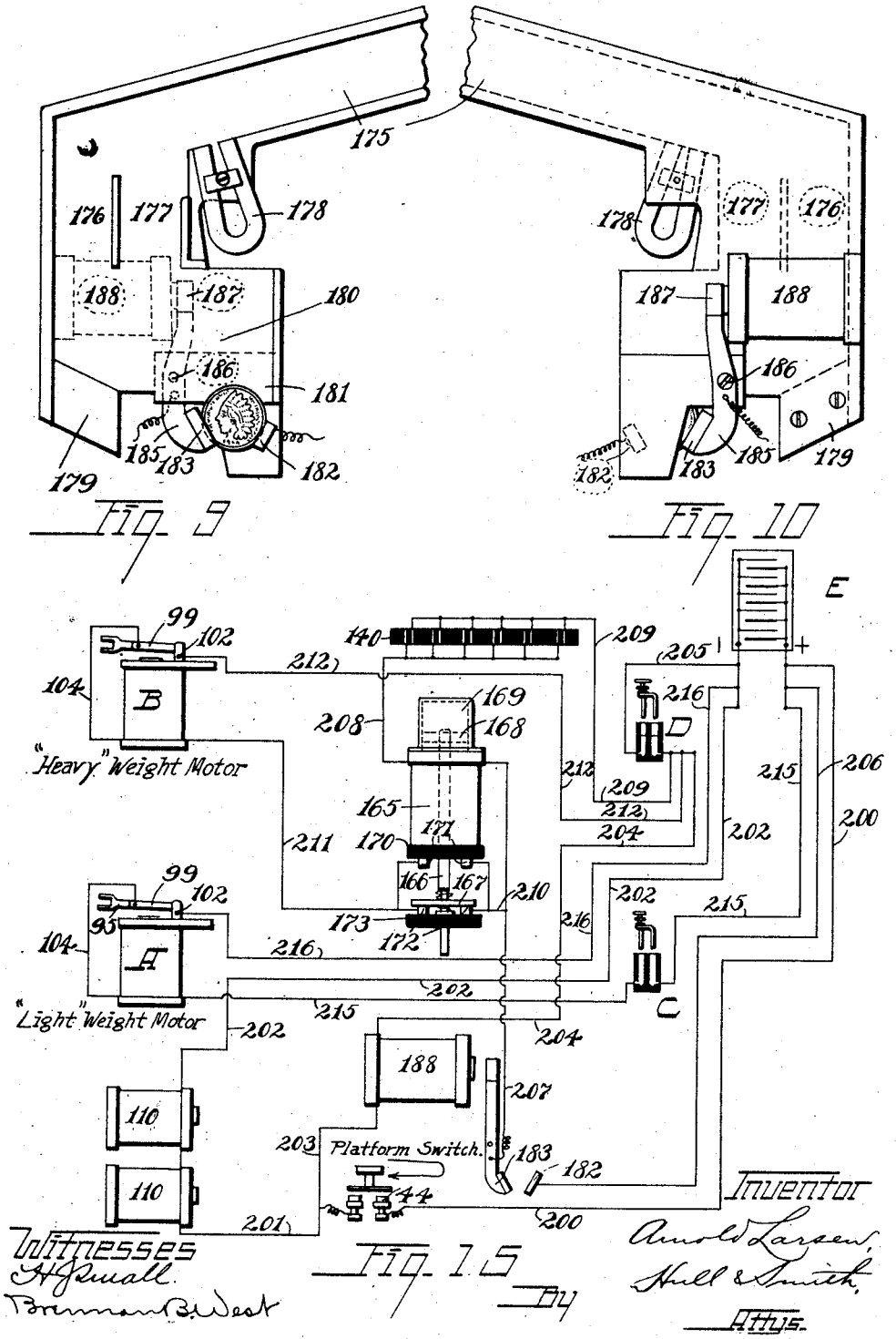

UNITED STATES PATENT OFFICE.

ARNOLD LARSEN, OF CLEVELAND, OHIO, ASSIGNOR TO THE UNITED VENDING MACHINE COMPANY, OF CLEVELAND, OHIO, A CORPORATION OF OHIO.

AUTOMATIC WEIGHING-MACHINE.

1,278,481.  Specification of Letters Patent.  Patented Sept. 10, 1918.

Application filed December 10, 1914. Serial No. 876,423.

*To all whom it may concern:*

Be it known that I, ARNOLD LARSEN, a subject of the King of Norway, residing at Cleveland, in the county of Cuyahoga and State of Ohio, have invented a certain new and useful Improvement in Automatic Weighing-Machines, of which the following is a full, clear, and exact description, reference being had to the accompanying drawings.

This invention relates to automatic weighing machines or scales, and more particularly to coin controlled machines of this character.

The invention has for its objects the provision of a weighing machine of the above nature that is thoroughly reliable and accurate, and in which accuracy is not impaired by long continued use of the machine, or changes of temperature, as is the case in automatic weighing machines wherein springs are employed as the load resisting medium; hence—the provision of an automatic weighing machine wherein a balancing weight (or weights) is employed as the load resisting element; the provision of a machine of the aforesaid character that is entirely automatic in its operation, the same being actuated by the presence of a person or object upon the platform or load support and an introduction of a coin to the machine; and, in a more limited sense, the provision of a weighing machine comprising a vibratory scale beam whereon a balancing weight (or weights) is moved along the beam, by mechanism that is set in operation by the depression of the load support or platform, until the weight (or weights) overbalances the load, the mechanism being rendered inoperative by the beam assuming intermediate or "balancing" position; wherein the weight (or weights) and other parts resume normal position upon the removal of the person or object from the platform or load support; wherein there is included, in certain embodiments of my invention, a coin retaining and releasing device that maintains the foregoing mechanism inoperative until a coin is inserted into the device.

I will now proceed to describe in detail that embodiment of my invention illustrated in the accompanying drawings, although I do not propose to be limited to such details further than required by the terms of the annexed claims, and rendered necessary by the state of the prior art.

Figure 7:
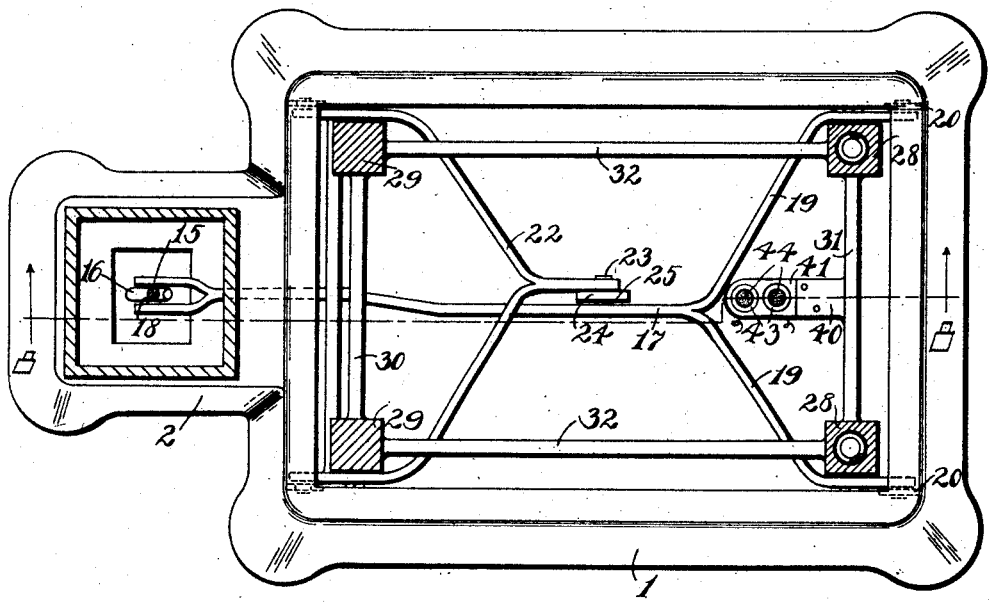
Figure 8:
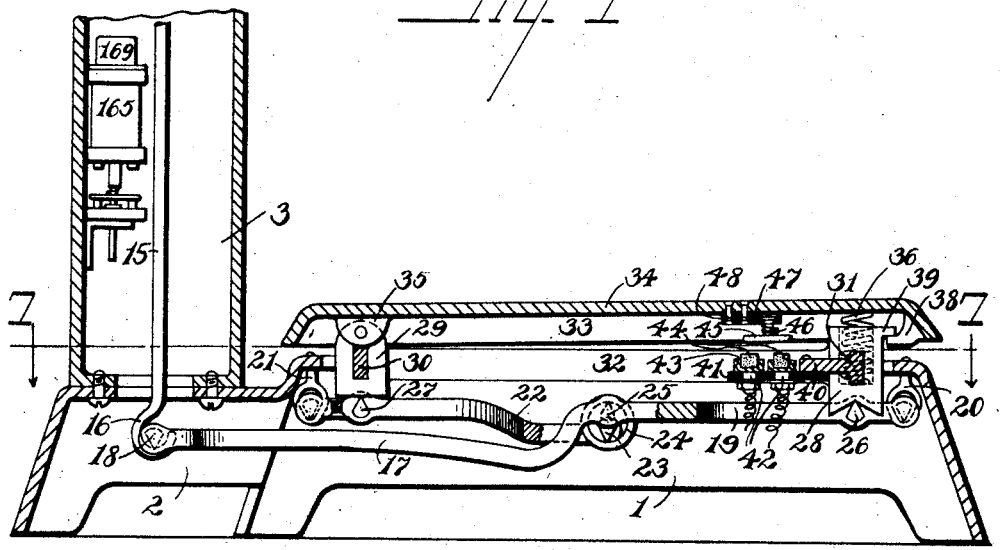

In the drawings, wherein similar reference characters designate corresponding parts throughout the several views, Figure 1 is a perspective view of the machine; Fig. 2 is a front elevation of the head of the machine, the casing being removed; Fig. 3 is a rear elevation of what is shown in Fig. 2, a part of the head and pedestal being broken away to reveal the inclosed mechanism; Fig. 4 is a plan view of the head of the machine with the casing removed; Figs. 5 and 6 are transverse sections through the head of the machine, the respective views being taken on the correspondingly numbered lines of Fig. 4; Fig. 7 is a horizontal section through the machine, between the base and platform, as indicated by the line 7—7 of Fig. 8; Fig. 8 is a vertical section through the lower portion of the machine, the same being taken substantially upon the line 8—8 of Fig. 7; Figs. 9 and 10 are a front and rear elevation, respectively, of the coin retaining and releasing device, the front plate or cover being removed; Figs. 11 and 12 are a plan and side elevation, respectively, of the mechanism or motor whereby one of the balancing weights is moved; Fig. 13 is a sectional detail on the lines 13—13 of Figs. 11 and 12, the same being on a somewhat enlarged scale; Fig. 14 is a section on line 14—14 of Fig. 3 and Fig. 15 is a diagram of the electric circuits involved in the machine.

Much of the machine or scales shown herein is that of a well known make and comprises a substantially rectangular base frame 1, from an extension 2 of which rises a hollow column or pedestal 3 that is surmounted by a shell 4 which supports a plate 5. The scale beam 6 is pivoted between the branches of a bifurcated bracket 7 which rises from the plate 5, and the beam has connection on one side of its pivot point, through the link 8, with the free end of a lever 9 that is fastened, at 10, within a clevis 11, that is supported by a hook 12 which depends from the underneath surface of the plate 5. Intermediate its ends, and at a point substantially central to the column or pedestal 3, the lever 9 has pivotally connected to it a rod 15 which extends downward through the column or pedestal, and terminates, at its lower end, in a hook 16 which hangs within the extension 2 of the base frame.

The free end of a lever 17 has a "knife-edge" bearing within the hook 16, as shown at 18, and the opposite end of the lever, is forked, as shown at 19, and each branch of the fork has similar pivotal connection with a clevis 20 which hangs from the upper edge of the base frame, as shown in Fig. 7. Clevises 21 hang from the opposite end of the base frame and support the separated ends of a yoke 22. This yoke extends to about the center of the base frame where it is provided with a knife-edge bearing 23 that is supported within a ring 24, which hangs from a bearing 25 of the lever 17. It will be observed from Fig. 7 that the ends of the branches of the forked end 19 of the lever 17, and the ends of the branches of the yoke 22, are parallel, and are provided with upwardly disposed knife-edge bearings, those of the lever 17 being shown at 26, and those of the yoke 22, at 27.

I substitute for the ordinary platform which has heretofore been supported upon the bearings 26 and 27, a skeleton frame comprising corner posts 28 and 29, for coöperation with the respective bearings 26 and 27. The posts 29 are connected by a transverse bar 30 and the posts 28 by a similar bar 31, while the posts 28 and 29 on each side of the frame are connected by parallel rails 32.

The platform or load support, designated at 34, has depending ears 35 which are pivoted to the upper ends of the posts 29, and the opposite end of the platform rests, normally, upon compression springs 36 which are contained within sockets in the corner posts 28, the upward movement of the platform, with respect to said posts, being limited by the engagement of a lug 38, carried by the platform, with a stop 39 that extends laterally from the upper end of one of the posts 28. Secured to an extension 40 of the transverse bar 31 of the skeleton frame, is a block of insulating material 41, which carries a pair of binding posts 42, each having a cupped head 43, for the reception of a carbon contact block 44, for coöperation with a contact disk 45, carried by a pin 46 which depends from a block of insulating material 47 that is secured to the platform 34. This electric contact device will be referred to, hereinafter, generally, as the platform switch.

The scale beam 6 comprises an upper and a lower branch 50 and 51, respectively, that are connected at their forward or "heavy" ends, by a portion 52, which extends through a loop or yoke 53, of a bracket 54, which rises from one end of the plate 5. At its opposite end, the branch 51 is connected to a portion 55 of the beam, adjacent its pivot point, and the corresponding end of the upper branch 50 is also secured to the portion 55 beyond the pivot point. The lower branch 51 is divided into "fifty-pound" graduations or divisions and carries what will be referred to, hereinafter as the "heavy" weight 56. To insure easy movement of the "heavy" weight along the branch 51 of the beam, I provide the same with rollers 57 which traverse the upper edge of the beam. A smaller weight 60 referred to hereinafter as the "light" weight, is slidable upon the branch 50 of the scale beam. This branch of the beam, it will be noticed, is divided into "one-pound" graduations, up to fifty pounds, so that when the "light" weight is at the extreme outer or "heavy" end of the branch 50, it will have the same effect as when the "heavy" weight reposes at the "fifty-pound" graduation upon the branch 51.

Particularly from Fig. 3, it will be seen that a pair of stationary rails 70 and 71 extend along side the scale beam and are supported at their ends from the previously mentioned brackets 7 and 54. Intermediate these rails and supported in the same manner, is a plate 72, having downwardly opening recesses 73, which correspond in number and spacing with the graduations upon the lower branch of the scale beam. Movable along the rail 70 is a slide 74, from the upper edge of which rises the projections 75, said projections being spaced apart to receive between them a pin 76 which extends from the rear side of the "light" weight 60. A similar slide 77 is movable along the lower rail 71 and is provided with upwardly extending projections 78, between which reposes a roller 79, that is carried by the "heavy" weight 56. From the description so far it will be seen that when either of the slides 74 or 77 is moved along its respective rail, the weight on the adjacent branch of the scale beam will be slid thereby by reason of the engagement of one of the projections of the slide with either the pin or the roller carried by the respective weight.

In Figs. 11, 12 and 13, I have shown a form of motor for moving the slides and, through them, the weights, as above explained. These motors are supported upon an extension 5ᵃ of the plate 5. The motors are identical, and a description of one will suffice for both. As a matter of distinction between the two motors, I will employ the reference numeral 80 to designate the drum of the motor which operates the slide 74, and through it the weight 60, and I will use reference numeral 81 to designate the drum of that motor which is operatively connected through the slide 77 to the "heavy" weight. The drum (80 or 81) is fixed upon a shaft 82 which has secured to it a ratchet wheel 83, said shaft being supported in suitable brackets 84 from the plate 5ª. An electromagnet 85 is mounted with its core vertically disposed, upon the plate 5ª, along side the ratchet 83 and the upper end of the magnet spool is formed by a plate 86 which extends laterally from one side of the magnet in a direction opposite the wheel 83. Pivoted between the ears 87, which rise from the projecting end of plate 86, is the rear end of what I will refer to as an armature beam 88, said beam being bifurcated at its forward end to receive an L shaped pawl 89 that is pivoted between the branches of said bifurcated end. The nose of the pawl extends into close proximity to the teeth of the ratchet wheel 83, while the opposite end or tail of the pawl is acted upon by a spring 90, secured by the screws 91 to the armature beam 88. Near its rear end the underneath side of the armature beam is provided with a recess for the reception of a spring 92, the lower end of which bears upon the plate 86. By this means, the beam is elevated to what will be considered its normal position. A bolt 93 passes downward through the beam and the spring and has a nut 94 applied to its lower end, the same answering to retain the spring in place and also as a stop to prevent undue upward movement of the beam.

From the above description of the motor, it will be seen that, when the magnet 85 is energized, the armature beam 88 will be drawn downward to project the nose of the pawl into contact with the teeth of the ratchet wheel 83 and to move said wheel a distance of one tooth. In order to effect a substantially continuous rotation of the wheel 83, therefore, it will be necessary to include means for intermittently interrupting the flow of current to the magnet in order to cause a vibration of the armature beam. Such an interrupter is provided by the lever 95 which is pivoted, near its forward end, to an ear 96 which rises from the plate 5ª. The forward end of the lever is forked, as shown at 97, and the pin 98, whereon the pawl 89 is pivoted, extends beyond the side of the armature beam 88 and between the branches of the fork 97. A contact spring 99 forms the rear end of the lever 95 and this is connected to, and insulated from, the pivoted end of the lever as shown at 100. The free end of the spring contact 99 rubs along the inner surface of a block of insulating material 101, and is arranged to engage a stationary contact point 102, when in its lowest position. The movement of the contact spring in an upward direction is limited by the stop 103. By means of a wire 104, one end of the magnet coil is electrically connected to the contact spring 99; and the contact point 102 is formed with a binding post 105. One side of the circuit which includes the coil of the magnet 85 connects with said coil at its ends opposite the wire 104 and the other side of the circuit connects with the binding post 105. Therefore, when current is introduced into the electro-magnet, the armature beam 88 is attracted by the magnet and the nose of the pawl drawn downward into contact with the teeth of the ratchet wheel 83, the full depression of the armature effecting a movement of the wheel substantially equal to one of its teeth. At the same time, the pin 98 will engage the lower branch of the fork 97 and rock the rear end of the lever 95 or that end formed by the contact spring 99, upward away from the contact point 102, thereby breaking the circuit which includes the electro-magnet and resulting in the deënergization thereof. Immediately the armature beam is returned to normal position by the spring 92, and the pin 98 engaging the upper branch of the fork 97 swings the rear end of the lever 95 downward to bring the spring contact 99 again into engagement with the contact point 102 to reëstablish the circuit and reënergize the magnet.

An electro-magnet 110 is suspended from the underneath side of the plate 5ª beneath each of the motors, and has an armature 111 which extends upward through a slot 112 in said plate, and has its upper end pivoted between ears 113 which rise from the plate. Within a cutaway portion of the armature is pivoted the lower end of a detent 114 that is drawn toward the ratchet wheel 83 by a spring 115, such spring having one of its ends connected to the detent and its opposite end connected to one of the brackets 84, wherein the shaft 82 is journaled. A spring 117, which has one of its ends attached to the plate 5ª, has its opposite end attached to the armature 111 and tends to draw the armature away from its magnet. It will be explained that the spring 117 is stronger than the spring 115, and that when the armature 111 is withdrawn from its magnet by the former spring, the upper end of the detent is withdrawn from within the range of the teeth of the wheel 83, the forward movement of the detent being limited by its engagement with a portion of the armature. However, when the magnet 110 is energized, and its armature 111 attracted toward it, the upper end of the detent 114 is drawn into engagement with the teeth of the ratchet wheel, by the spring 115.

As shown clearly in Fig. 3, a strand 120 of suitable material, such as a fine piano wire, is attached, at 121 to the slide 74 and extends over a sheave 122 to the drum 80. After passing a few turns about the drum, it is extended over a sheave 123, located at the end of the rail 70 opposite the sheave 122, and has its opposite end attached to the slide 74 at 124. A strand 125, which has connection at 126 with the slide 77, passes about the drum 81 and thence, over a sheave 127 to where its opposite end has connection at 128, to the slide. A strand 129 is also connected to the slide 77 at 128 and, passing over the sheave 127, and a sheave 130 that is journaled between the ears 131 which rise from the plate 5, extends downward through an opening in the plate and carries, at its lower end, a weight 132, within the column 3. A similar weight 133 is suspended from the lower end of a strand 134 which passes upward through the column and through an opening in the plate 5, over a sheave 135 which is supported from said plate, and over a sheave 136, that is supported from the rail 71, to the sheave 122 and thence to where it has connection at 121 with the slide 74.

A strip 140 of insulating material extends along the plate 5, and is spaced to the rear of the rail 71, as clearly shown in Fig. 4. This strip is provided with a series of pairs of contact points or plates 141, said pairs corresponding in number and spacing to the notches 73 in the plate 72. A contact shoe 142 is slidable along the upper side of the strip and coöperates with the contact plates 141, said shoe being of sufficient length to bridge the contact plates of the respective pairs. The shoe 142 is swiveled to the lower end of a pin 143 that depends from a block of insulating material 144 that is carried by the slide 77.

Supported upon the outer end of the plate 5ª is a mercury switch comprising a body 145 of insulating material, which is provided with a pair of wells 146 and 147, each of which contains a quantity of mercury 148 that is entered by a screw 149, threaded through the side of the cup and extending into said well. The outer ends of the screws constitute binding posts as shown in Fig. 3. A screw 152 is threaded through the outer end of a block 153 of insulating material which is secured to the adjacent end of the scale beam, the lower end of such screw projecting downward into the well 146 of the block 145. A contact strip 154 extends downward into the well 147, and said strip is secured to the block 153, by having its end perforated for the passage of the screw 152 therethrough, the strip being held against the block 153 by a nut 155. It will be seen from the foregoing that the two wells of the switch will be bridged upon the depression of the adjacent end of the scale beam. The opposite end of the scale beam is provided with contact members, similar to the ones just described, and consisting of a screw 156, that is threaded through a block of insulating material 157 carried by the scale beam, and a contact strip 158. A block of insulating material 159, having a pair of mercury wells, is secured to the side of the rail 71. These mercury wells are provided with binding posts 160 and 161.

In Fig. 15 there is shown a circuit-breaker which comprises a solenoid 165, and, as will be seen from Fig. 8 it is located within the column 3 of the machine. The solenoid being in a vertical position, its core 166 will drop by gravity when its coil is deënergized. A yielding contact plate 167 is carried by the lower end of the core 166, and the opposite end of the core has connected to it the piston 168 of a dash pot 169, whereby the action of the solenoid is retarded. Extending from the head 170 of the solenoid are a pair of contact points 171, and a pair of similar contact points 172 rise from a plate of insulating material 173 which is spaced from, and fixed with respect to the head of the solenoid.

In Figs. 9 and 10 I have shown in detail a coin retaining and releasing device that is situated in the upper end of the column 3, as shown in Fig. 3. The body of the device is preferably formed of a single casting and comprises a chute 175 which registers with a coin receiving opening 175ª in the casing. The chute 175 is inclined downward from said opening and merges, at its lower end, into vertical passageways 176 and 177. A permanent magnet 178 is located adjacent the upper end of the passageway 177, and a block or anvil 179 extends across the lower end of the passageway 176. Spaced laterally from the anvil 179, a distance equal to substantially the width of the passageway 177, is the coin retaining and releasing mechanism proper, the foregoing parts constituting, in fact, a coin detector. To the rear side of the body portion 180 is secured a block of insulating material 181 having a depending portion to which is fastened a stationary coin receiving jaw 182. A movable jaw 183 is carried by the lower end of a lever 185 which is pivoted at 186 to the aforesaid block 181, and the upper end of the lever constitutes an armature 187 of a magnet 188 which is supported from the rear side of the coin receiving device. The jaws 182 and 183, together with a proper coin, constitute an electric switch, as will be explained hereinafter. A plate (not shown) is attached to the front of the coin receiving device to inclose the chutes and passageways.

When a coin is inserted into the coin receiving opening and gravitates down the chute 175, its momentum will carry it across the upper end of the passageway 177 and it will drop through the passageway 176 into contact with the anvil 179, and because of the inclination of the upper face thereof, will rebound over into the jaws of the coin retaining device. Should a steel slug be inserted into the device, the movement of the same down the chute will be retarded by the permanent magnet 178 so that said slug will drop down the passageway 177 and directly through the device. In the event that a lead slug is introduced into the machine, it will take the same course as the coin until it strikes the anvil 179, and being comparatively soft and non-resilient it will not rebound but will simply fall off of the anvil and drop through the device.

Referring to Figs. 2, 3, and 4, attention is called to a cam plate 190 which extends upward and over the "heavy" end of the scale beam, from the upper end of the bracket 54. This cam plate is in a position to be engaged by the upper end of the light weight 60 when the cam shall have traveled to the extreme outer or "heavy" end of its beam branch, and, because of its shape, will effect a depression of said end of the beam for a purpose which will become apparent further along.

In the following description, the motor which is operatively connected to the "light" weight 60 will be referred to as the motor A, and the one whereby the "heavy" weight 56 is moved, will be referred to as the motor B. And the mercury switch that is located adjacent the free or "heavy" end of the beam will be referred to as the switch D, while the other mercury switch or that supported upon the plate 5ᵃ, will be referred to as switch C.

Referring now to the diagram which constitutes Fig. 15, a source of electric energy is represented by a battery E. A wire 200 leads to one side of the platform switch, the same having connection with one of the binding posts 42 of a contact point 44, as shown in Fig. 8. The opposite side of the platform switch, or the other contact point 44 thereof, has connection with a wire 201 which leads to the electro-magnets 110, and a wire 202 extends from these electro-magnets back to the battery or negative side of the circuit. A wire 203, which also has connection with the last mentioned contact point 44 of the platform switch, leads to the magnet 188 which controls the coin retaining and releasing device, and a wire 204 extends from said magnet to one side of the mercury switch D, the opposite side of said switch being connected to the negative side of the circuit by the wire 205. Returning again to the positive side of the circuit, a wire 206 leads therefrom to the stationary coin receiving jaw 182, and the opposite or movable jaw 183 has connected to it a wire 207 which leads to the coil of the solenoid 165, the opposite end of said coil having connection, through the wire 208, with one of the contact plates 141 of each of the pairs, supported by the strip of insulating material 140. The opposite plate of each pair has connection through the wire 209, with one side of the switch D. The wire 207 connects, through a branched wire 210, with one of the contact points 171 and 172 of the circuit-breaker, and the other contact points 171 and 172 have connection, through the wire 211, with one end of the electro-magnet coil of the "heavy" weight motor B. Through the wire 104, the opposite end of the magnet coil has connection with the contact spring 99 of the interrupter, and the other element of the interrupter, or the contact point 102, has connection, through the wire 212 with the switch D. A third wire 215 leads from the positive side of the circuit, through the switch C, to the coil of the "light" weight motor A, the opposite side of said motor, or its respective contact point 102, having connection with the negative side of the circuit, through the wire 216.

The operation of the machine is as follows. A person stands upon the platform or load support of the machine, or a load of some sort is placed thereon. Upon the depression of the platform 34, the contact points 44 of the platform switch are bridged by the plate 45, and a circuit is established through the wire 201, the electro-magnets 110, and the wire 202. By the energization of the electro-magnets 110, the detents 114 are moved into engagement with their respective ratchet wheels 83. It will be recalled that the "heavy" weight normally reposes at the free or "heavy" end of the scale beam, thereby holding it depressed, and the mercury switch D closed. A part of the current will therefore flow through the wire 203, the electro-magnet 188, the wire 204, the aforesaid switch D and the wire 205, to the negative side of the circuit. The electro-magnet 188, thus being energized, will attract its armature and move the jaw 183 of the coin retaining device toward the stationary jaw 182 thereof.

Upon the insertion of a proper coin within the coin receiving opening 175ᵃ, and the lodgment of the same between the jaws 182 and 183, another circuit will be established through the wire 206, the coin and coin retaining jaws, the wire 207, wire 210, contact points 172 and plate 167, wire 211, the "heavy" weight motor B, wire 212, switch D, and the wire 205. The coil of the motor B thus being energized, said motor will operate to move the slide 77 along the rail 71, and the engagement of one of the branches 78 of said slide with the roller 79 of the "heavy" weight, will move said weight along its branch of the scale beam. As the contact shoe 142, which is carried by the slide 77, bridges the first pair of contact plates 141, a circuit will be established through the coil of the solenoid 165, the wire 208, the aforesaid contact plates 141, the wire 209, switch D, and the wire 205. It will be explained that when the shoe 142 bridges a pair of contact plates 141, the roller 79 is directly beneath a corresponding notch 73 of the plate 72, and the "heavy" weight is adjacent one of the graduations of its scale beam branch. Upon the energization of the solenoid coil, its core 166 will be drawn upward to remove the contact plate 167 from the points 172, into contact with the points 171. During this movement of the plate 167, which movement is retarded by the dash pot 169, current to the "heavy" weight motor is cut off and the operation of said motor is consequently suspended. Upon the bridging of the contact points 171, however, said motor is again put into operation, to move the slide 77 farther along the rail 71, whereupon the shoe 142 is removed from one of the contact plates 141, to open the circuit through the solenoid coil. The solenoid thus being deënergized, permits its core to drop by gravity, and the plate 167 is again lowered upon the contact points 172. Although the operation of the motor B is temporarily suspended during the downward travel of the plate 167, it will again be thrown into operation upon the arrival of the plate 167 into contact with the points 172. The "heavy" weight continues to travel to its next graduation, when the operation will be temporarily suspended as aforesaid, with its roller 79 beneath the next notch 73. The movement of the "heavy" weight from the free or "heavy" end of its beam branch will continue until its roller 79 reposes beneath a notch 73 which corresponds to a "fifty-pound" graduation which represents a weight equal to or less than that of the load or person upon the platform. The "heavy" weight will then be overbalanced and the free or "heavy" end of the scale beam will then rise, such action being permitted by reason of the fact that the roller 79 of the "heavy" weight is in a position to enter one of the notches 73. We will assume that the load upon the platform weighs something between that represented by the "fifty-pound" graduation at which the "heavy" weight is brought to rest, and the next graduation. In such an event, the free end of the scale beam rises high enough not only to open the switch D by withdrawing the contact points comprising the screw 156 and the strip 158 from the wells of mercury, but sufficient to cause its opposite end to move downward to project the contact points carried by it into the wells of the mercury switch C. Said switch C having been closed, a circuit is established through the wire 215, the "light" weight motor A, and the wire 216, whereupon said motor will be actuated to move the slide 74 along the rail 70, and through the engagement of one of its projections 75 with the pin 76 of the "light" weight 60, moves said weight along its branch of the beam until it reaches a point thereon to balance the load upon the platform. When the "light" weight reaches balancing position, the contact points will be withdrawn from the mercury wells of the switch C and the circuit last described will be broken. The motors A and B are therefore at rest. As long as the load remains upon the platform and the platform switch is closed, current will continue to flow through the wire 200, wire 201, electro-magnets 110, and the wire 202 to the negative side of the circuit, thereby retaining the magnets 110 energized to hold the detents into engagement with the ratchet wheels 83. In this way, the drums 80 and 81 of the respective motors are held against turning in a direction opposite to that in which they have been rotated by their respective motors. As soon as the load is removed from the platform and the platform switch opened, the circuit just mentioned will be broken and the electro-magnets 110 deënergized, thereby to release their respective ratchet wheels and the aforesaid drums, and the weights 132 and 133, which hang from the strands 129 and 134 respectively, will move the respective balancing weights to their normal positions.

Attention is called to the fact that when the "heavy" weight has been moved along its respective branch of the scale beam from the "heavy" to the "light" end thereof, until it is overbalanced by the load upon the platform, and the switch D has been opened by the rise of the free or "heavy" end of the scale beam, the electro-magnet 188 will be deënergized and the jaws of the coin retaining device will be permitted to separate to allow the coin to drop into a suitable coin receiving receptacle.

The fact that the coin is released before the weight of the load upon the platform can be ascertained, and the further fact that the coin itself constitutes a part of one of the circuits through which the operation of the machine is initiated, provides a very positive safeguard against the machine being used to ascertain the weights of different objects, placed successively upon the platform, by the use of a single coin.

Where I have shown and described a scale of the "platform" type to which my invention is applied, it will be understood that I do not thereby limit the use of my invention to scales of such type. Furthermore, although I employ the term "coin-controlled" in a number of the claims hereto annexed, I do not thereby propose to limit myself in such claims to the use of a coin as distinguished from a check or other well known equivalent for rendering operative the combinations in which this term may appear.

Having thus described my invention, what I claim is:

1. In an automatic weighing machine, the combination of a load-carrying member, a branched scale beam operatively connected thereto, a weight on each of the beam branches, an electric circuit for moving the heavy weight from position to position along its branch and from the heavy toward the light end thereof and adapted to be closed by the movement of said member under load, a coin retaining and releasing device in said circuit coöperating with said member to close the circuit when a coin is therein, means preventing the over-balancing or tilting of the beam by the load except when the heavy weight is at one of such positions, means for automatically releasing the coin when the beam shall have been tilted by the platform load, an electric circuit for moving the light weight along its beam from the light toward the heavy end thereof, means operative by the tilting of the beam under load for closing such second circuit, means for automatically breaking such second circuit when the light weight shall have reached load-balancing position, additional means for automatically breaking the second circuit when the light weight shall have moved a predetermined distance along its branch, and means operating automatically to restore the weights to initial position upon their respective beam branches when the load has been removed or lightened.

2. In an automatic weighing machine, the combination of a load carrying member, a branched scale beam operatively connected thereto, a weight on each of the beam branches, an electric circuit for moving the heavy weight from position to position along its branch and from the heavy toward the light end thereof and adapted to be closed by the movement of the load carrying member under load, a coin retaining and releasing device in said circuit coöperating with the platform to close the circuit when a coin is therein, means preventing the over-balancing or tilting of the beam by the load except when the heavy weight is at one of such positions, means for automatically releasing the coin when the beam shall have been tilted by the load, an electric circuit for moving the light weight along its beam from the light toward the heavy end thereof, means operative by the tilting of the beam under load for closing such second circuit, means for automatically breaking such second circuit when the light weight shall have reached load-balancing position, and means operating automatically to restore the weights to initial position upon their respective beam branches when the load has been removed or lightened.

3. In an automatic weighing machine, the combination of a load carrying member, a branched scale beam operatively connected thereto, a weight movable along each of said branches, means including the load carrying member and effective only when said member is moved in one direction under load for automatically moving the heavy weight intermittently along its branch to successive positions from the heavy toward the light end thereof and for arresting such movement at each successive position, means for preventing the overbalancing of the beam except when the heavy weight is in one of such rest positions, mechanism for rendering such weight moving means inoperative when the said weight is overbalanced by the load, means operating automatically by the tilting of the scale beam for moving the light weight along its branch to load-balancing position, and means operative by the movement of said member in the reverse direction for automatically restoring the weights to initial position.

4. In an automatic weighing machine, the combination of a load carrying member, a branched beam operatively connected thereto, weights movable along the branches of said beam, coin controlled means operative by the movement of the load carrying member under load for automatically moving the heavy weight intermittently along its branch from the heavy toward the light end thereof and to successive positions thereupon and for arresting such movement at each such rest position, means for preventing the overbalancing of the beam except when the heavy weight is at such rest position, mechanism for rendering such weight moving means inoperative when the said weight is overbalanced by the load, means operating automatically by the tilting of the scale beam for moving the lighter weight along its branch to load-balancing position, and means operative by the movement of the load carrying member for automatically restoring the weights to initial position.

5. In an automatic weighing mechine, the combination of a load carrying member, a branched scale beam operatively connected thereto, a weight movable along each of such branches, an electric circuit for moving the heavy weight intermittently along its branch and from the heavy toward the light end thereof, means operating automatically to temporarily break said circuit when the weight reaches a position where the scale beam is overbalanced by the load on the load carrying member, an electric circuit for moving the light weight along its beam from the light toward the heavy end thereof, means operative by the overbalancing of the scale beam by the load for closing such second circuit, and means for breaking the second circuit when the light weight has moved to load-balancing position, and means operating automatically to restore the weights to their initial positions when the load has been removed from the load carrying member.

6. In an automatic weighing machine, the combination of a load carrying member, a branched scale beam operatively connected thereto, a weight on each end of said branches, means for moving the heavy weight from the heavy toward the light end of its beam and intermittently from position to position therealong, means preventing the tilting of the beam by the load except when the said weight is at one of such positions, and means operative after the beam shall have been tilted by the load for automatically moving the light weight to balancing position on its branch.

7. In an automatic weighing machine, the combination of a load carrying member, a branched scale beam operatively connected thereto, a weight on each of said branches, an electric circuit for moving the heavy weight from the heavy toward the light end of its branch and from position to position therealong, means operating to temporarily break said circuit when the weight is at each such position, means preventing the overbalancing or tilting of the beam by the load except when the heavy weight is at one of such positions, means for automatically breaking the circuit when the beam shall have been tilted by the load, an electric circuit for moving the light weight along its beam from the light toward the heavy end thereof, and means for automatically breaking the second circuit when the last mentioned weight shall have reached load-balancing position.

8. In an automatic weighing machine, the combination of a load carrying member, a branched scale beam operatively connected thereto, a weight movable along each such branch, an electric circuit for moving the heavy weight from position to position on its branch and from the heavy toward the light end thereof, means operating automatically to temporarily break said circuit when the weight is at a position whereby the scale beam is overbalanced by the load on said member, an electric circuit for moving the light weight along its branch from the light toward the heavy end thereof, means operative by the overbalancing of the scale beam by the load for closing such second circuit, and means for breaking the second circuit when the lighter weight has moved to load-balancing position.

9. In an automatic weighing machine, the combination of a load carrying member, a branched scale beam operatively connected thereto, a weight movable along each such branch, an electric circuit for moving the heavy weight intermittently from position to position along its branch and from the heavy toward the light end thereof, means for automatically breaking said circuit when said weight reaches a position where the scale beam is overbalanced by the load, an electric circuit for moving the light weight along its beam from the light toward the heavy end thereof, means operative by the overbalancing of the scale beam by the load for closing such second circuit, means for breaking the second circuit when the light weight has moved to load-balancing position, and means operating automatically to restore the weights to their initial position when the load has been removed from the load carrying member.

10. In an automatic weighing machine, the combination of a load carrying member, a branched scale beam operatively connected thereto, an electric circuit for moving the heavy weight intermittently from position to position along its branch from the heavy toward the light end thereof, means for automatically breaking said circuit when said weight reaches a position where the scale beam is overbalanced by the load, an electric circuit for moving the lighter weight along its beam from the light toward the heavy end thereof, means operative by the overbalancing of the scale beam by the load for closing such second circuit, and means for breaking the second circuit when the lighter weight has been moved to a load-balancing position.

11. In an automatic weighing machine, the combination of a load carrying member, a scale beam operatively connected thereto, a weight movable along said beam, an electric circuit for moving said weight, and means for automatically and momentarily breaking the circuit for a short period only when the weight shall have been moved to a predetermined position on said beam whereby said weight is caused to pause at said point for the purpose described.

12. In an automatic weighing machine, the combination of a load carrying member, a branched scale beam operatively connected thereto, a weight on each of said branches, an electric circuit for moving the heavy weight from the heavy toward the light end of its branch and from position to position therealong, means operating to temporarily break said circuit when the weight is at each such position, means preventing the overbalancing or tilting of the beam by the load except when the heavy weight is at one of such positions, means for automatically breaking the circuit when the beam shall have been tilted by the load, an electric circuit for moving the light weight along its beam from the light to the heavy end thereof, means for automatically breaking the second circuit when the last mentioned weight shall have reached load-balancing position, and means operating automatically to restore the weights to initial position on their respective branches when the load has been removed or lightened.

13. In an automatic weighing machine, the combination of a load carrying member, a branched scale beam operatively connected thereto, a weight movable along each of the branches of said beam, said beam and load carrying member being normally overbalanced by said weights, coin controlled means for automatically moving one of said weights along its branch until said weight is overbalanced by the load, means operating thereafter for automatically moving the other weight along its branch to load-balancing position, and means for thereafter automatically returning both of said weights to initial position.

14. In an automatic weighing machine, the combination of a load carrying member, a branched scale beam operatively connected thereto, a weight on each branch, means for automatically moving the weights in opposite directions and successively along their branches to load balancing position, coin controlled mechanism, connections between said mechanism and said load carrying member for rendering said automatic means operative, and means for thereafter automatically returning both of said weights to initial position.

15. In an automatic weighing machine, the combination of a load carrying member, a branched scale beam operatively connected thereto, a weight movable along each branch of said scale beam, said beam and load carrying member being normally overbalanced by said weights, coin controlled means for automatically moving one of said weights along its beam branch until overbalanced by the load, and means controlled by the tilting of said branch for automatically moving the other weight along its branch to load-balancing position.

16. In an automatic weighing machine, the combination of a load supporting member, a branched scale beam operatively connected thereto, a weight movable along each branch of said beam, said beam and load carrying member being normally overbalanced by said weights, coin controlled means for automatically moving one of said weights along its beam branch until said weight is overbalanced by the load, and means operating thereafter for automatically moving the other weight along its branch to load-balancing position.

17. In an automatic weighing machine, the combination of a load carrying member, a scale beam operatively connected thereto, a weight movable along said scale, means for moving said weight to balanced position on the scale, means for retaining said weight in the adjusted position, and means controlled by the load carrying member for releasing the retaining means.

18. In an automatic weighing machine, the combination of a load carrying member, a scale beam operatively connected thereto, a weight movable along said scale beam, said weight being biased to a neutral position by counterweights, means for moving said weight to a balanced position on said scale weight against the pull of said counter weights, means for retaining said weight and counterweights in the adjusted position and means controlled by the load carrying member for releasing the retaining means.

19. In an automatic weighing machine, the combination of a load carrying member, a scale beam operatively connected thereto, a weight movable along said scale beam, said weight being biased to a neutral position by counterweights, means for moving said weight to balance positions on the scale beam, and means controlled by the load carrying member for retaining said weights in the adjusted position during the weighing operation and releasing said weights after the weighing operation is complete.

20. In an automatic weighing machine, the combination of a load carrying member, a branch scale beam operatively connected thereto, a weight movable along each of the branches, said weights being biased to a neutral position by counter-weights, coin controlled mechanism for moving said weights to balanced positions on said branches against the pull of the counter weights, and means controlled by the load carrying member for retaining said weights in the adjusted positions during the weighing operation and releasing said weights after the weighing operation is complete.

21. In an automatic weighing machine, the combination of a load carrying member, a scale beam operatively connected thereto comprising two parallel branches, a weight movable along each of said branches, said weights being biased in opposite directions to neutral positions on the scale beam branches by counter weights, coin controlled mechanism for moving said weights to balanced positions against the pull of said counter weights, an electromagnet for retaining said weights in the adjusted position, and means controlled by the load carrying member for deënergizing said electromagnet.

22. In an automatic weighing machine, the combination of a load carrying member, a branched beam operatively connected thereto, a weight movable along each branch of the beam, coin retaining and releasing means coöperating with means operative by the movement of the load carrying member in one direction under load for automatically moving the heavy weight along its branch from the heavy toward the light end thereof and for arresting such movement at successive positions thereupon, mechanism for rendering such weight feeding means inoperative when said weight is overbalanced by the load, means operating automatically by the tilting of the scale beam for releasing the coin and moving the light weight along its branch to load-balancing position, and means operative by the movement of the load carrying member in the reverse direction for automatically restoring the weights to initial position.

23. In an automatic weighing machine, the combination of a load carrying member, a branched beam operatively connected thereto, a weight movable along each branch of the beam, coin retaining and releasing means coöperating with means operative by the movement of the load carrying member in one direction under load for automatically moving the heavy weight along its branch from the heavy toward the light end thereof and for arresting such movement at successive positions thereupon, mechanism for rendering such weight moving means inoperative when the said weight is overbalanced by the load, means operating automatically by the tilting of the scale beam for releasing the coin and moving the light weight along its branch to load-balancing position, and means operative when the heavy end of the scale beam has been depressed for automatically restoring the weights to initial position.

24. In an automatic weighing machine, the combination of a scale beam, a weight movable therealong, a load carrying member, a normally open electric circuit having spaced coin retaining contacts for moving the weight along the scale beam, and means controlled by the load carrying member whereby a coin may be released from between said contacts.

25. In an automatic weighing machine, the combination of a scale beam, a weight movable therealong, a load carrying member, an electric circuit for moving the weight along the scale beam, said circuit including a coin-receiving device, and means controlled by the load carrying member whereby the circuit will be closed through the presence of a coin in said device.

26. In an automatic weighing machine, the combination of a load carrying member, a branched scale beam operatively connected thereto, a weight movable along each branch of said beam, electric circuits for feeding the heavy weight and the light weight in sequence along their respective branches, the circuit for feeding the heavy weight being provided with a coin retaining device whereby the circuit may be closed by the insertion of a coin thereinto, means operated by the overbalancing of the heavy weight for closing the circuit for moving the light weight along its branch, and means for releasing the coin from the retaining device before the light weight has been moved to load-balancing position.

27. In an automatic weighing machine, the combination of a load carrying member, a branched beam operatively connected thereto, a weight movable along each branch of the beam, coin retaining and releasing means coöperating with means operative by the load upon the load carrying member for automatically moving the heavy weight along its branch from the heavy toward the light end thereof and for arresting such movement at successive positions thereupon, mechanism for rendering such weight moving means inoperative when said weight is overbalanced by the load, means operating automatically by the tilting of the scale beam for releasing the coin and moving the light weight along its branch to load balancing position, and means operative thereafter for automatically restoring the weights to their respective initial positions.

28. In an automatic weighing machine, the combination of a load carrying member, a branched scale beam operatively connected thereto, a weight movable along each of said branches, an electric circuit for automatically moving the heavy weight intermittently along its branch to successive positions from the heavy toward the light end thereof and for arresting such movement at each successive position, means for preventing the overbalancing of the beam except when the heavy weight is in one of such rest positions, mechanism for rendering such weight moving means inoperative when the said weight is overbalanced by the load, means operating automatically by the tilting of the scale beam for moving the light weight along its branch to load balancing position and means operative by movement of said member in one direction for automatically restoring the weights to initial position.

29. In an automatic weighing machine the combination of a load carrying member, a branched scale beam operatively connected thereto, a weight on each of the branches of said beam, said beam and load carrying member being normally overbalanced by said weights, means for automatically moving one of said weights along its beam branch until said weight is overbalanced by the load, means operating thereafter to automatically move the other weight along its branch to load balancing position and means for thereafter automatically returning both of said weights to initial position.

30. In an automatic weighing machine the combination of a load carrying member, a branched scale beam operatively connected thereto, a weight movable along each of the branches, means for automatically moving the heavy weight along its branch from the heavy toward the light end thereof and for resting such movement at successive positions therealong, means for preventing the overbalancing of the beam except when the heavy weight is at one of such positions, mechanism for rendering such weight moving means inoperative when the said weight is overbalanced by the load, means operating automatically by the tilting of the scale beam for moving the lighter weight along its branch to load balancing position and means for automatically restoring the weights to initial position.

31. In an automatic weighing machine, the combination of a load carrying member, a graduated scale beam operatively connected thereto, a weight movable along said beam, means for automatically moving the weight intermittently to successive graduations thereon and from the heavy toward the light end of the beam, mechanism for automatically rendering the weight moving means inoperative when said weight has been overbalanced by the load, and means preventing the overbalancing of the weight except when in register with a graduation of the beam.

32. In an automatic weighing machine, the combination of a load carrying member, a scale beam operatively connected thereto, a weight movable along said beam, means for automatically moving the weight intermittently to successive positions therealong and from the heavy toward the light end of the beam, mechanism for automatically rendering the weight moving means inoperative when said weight has been overbalanced by the load, and means preventing the overbalancing of the weight except when at one of the rest positions on said beam.

33. In an automatic weighing machine, the combination of a load carrying member, a scale beam operatively connected thereto, a weight movable along said beam, means for automatically moving the weight intermittently to successive positions therealong and from the heavy to the light end of the beam, and mechanism for automatically rendering the weight moving means inoperative when said weight has been overbalanced by the load.

34. In an automatic weighing machine, the combination of a load carrying member, a scale beam operatively connected thereto, a weight movable along said beam, means for automatically moving the weight to successive positions therealong and from the heavy toward the light end of the beam, and mechanism for automatically rendering the weight moving means inoperative by the tilting of said beam.

35. In an automatic weighing machine, the combination of a load carrying member, a branched scale beam operatively connected thereto, a weight movable along each branch of said beam, means for automatically moving one of said weights along its beam branch until overbalanced by the load, and means operative by the overbalancing of said branch for automatically moving the other weight along its branch to load-balancing position.

36. In an automatic weighing machine, the combination of a load carrying member, a scale beam operatively connected thereto having a plurality of rest graduations thereon, weight movable along said beam and adapted to rest momentarily at said rest graduations, an electric circuit for moving said weight, and means for automatically and momentarily breaking the circuit when the weight reaches each of said graduations.

In testimony whereof, I hereunto affix my signature in the presence of two witnesses.

ARNOLD LARSEN.

Witnesses:
WM. GENT,
BRENNAN B. WEST.

Copies of this patent may be obtained for five cents each, by addressing the "Commissioner of Patents, Washington, D. C."